United States Patent [19]

Suzuki et al.

[11] Patent Number: 4,786,930
[45] Date of Patent: Nov. 22, 1988

[54] LENS SHUTTER USING AN ELECTROSTRICTIVE STRAIN ELEMENT AS DRIVING SOURCE MEANS

[75] Inventors: Akira Suzuki; Haruki Ōe; Kiyoshi Touma, all of Tokyo, Japan

[73] Assignee: Copal Company Limited, Tokyo, Japan

[21] Appl. No.: 136,555

[22] Filed: Dec. 22, 1987

[30] Foreign Application Priority Data

Dec. 25, 1986 [JP] Japan ................................. 61-202872

[51] Int. Cl.$^4$ ........................... G03B 7/00; G03B 9/14
[52] U.S. Cl. .................................. 354/234.1; 354/265
[58] Field of Search ..................... 354/226, 234.1, 250, 354/265

[56] References Cited

U.S. PATENT DOCUMENTS 3,110,824  11/1963  Flanagan ..................... 354/234.1 X Primary Examiner—Michael L. Gellner
Attorney, Agent, or Firm—Spensley Horn Jubas & Lubitz

[57] ABSTRACT

A lens shutter using an electrostrictive strain element as a driving source, arranging a shutter blades opening and closing lever and the electrostrictive strain element driving the opening and closing lever so that inertia forces acting on the opening and closing lever through engagement with the electrostrictive strain element and acting on the electrostrictive strain element through engagement with the opening and closing lever are counterbalanced by each other, in order to eliminate variations of exposure caused by various positions of a camera. The basic portion of the electrostrictive strain element is secured to a retaining member supported rotatably on a shutter base plate and the retaining member may well be biased by a spring to increase the inertia force of the electrostrictive strain element. Thereby, even if a shock is applied to the shutter from the outside, it does not occur that the shutter blades are inadvertently opened and closed. The rotation of the retaining member to rotate the opening and closing lever in a direction to open the shutter blades through the electrostrictive strain element is prevented by an eccentric pin.

4 Claims, 1 Drawing Sheet

LENS SHUTTER USING AN ELECTROSTRICTIVE STRAIN ELEMENT AS DRIVING SOURCE MEANS

BACKGROUND OF THE INVENTION (a) Field of the Invention

The present invention relates to a lens shutter, and more particularly to a driving mechanism for a lens shutter using what is called an electrostrictive strain element which is variable in an amount and direction to be distored by voltage applied thereto and serves as a driving source having properties of being returned to an original form by discharging electric charge stored therein.

(b) Description of the Prior Art

In the past, a lens shutter mechanism provided with two shutter blades has been designed so that the shutter blades are roughly the same in weight to thereby restrain inertia from being changed in accordance with various positions of a camera body and so that variations in exposure accuracy are prevented by that restraint.

However, even if mutual balance of weight of the shutter blades is secured, the effect on the various positions of the camera body caused by the weight of an opening and closing lever for operating the shutter blades is not yet eliminated and also the effect on the weight of an electrostrictive strain element per se is not negligible. In short, if the driving force of the electrostrictive strain element is constant and minor, if follows that the operating speed of the shutter blades fluctuates due to the various positions of the camera and irregularity in exposure is brought about. Furthermore, the electrostrictive strain element, which has inevitably weight in some extent, causes unnecessary displacement due to a shock received from the outside and consequently there has been an inconvenience that the shutter blades are opened inadvertently and exposure is performed.

SUMMARY OF THE INVENTION

A primary object of the present invention is to provide a lens shutter of the type using an electrostrictive strain element, as a driving source, constructed so that irregularity in exposure caused by various positions of a camera is eliminated.

Another object of the present invention is to provide a lens shutter of the above type designed so that shutter blades are prevented from opening and closing unnecessarily due to, for example, a shock received from the outside.

These objects are accomplished, according to the present invention, by being provided with a base plate having an exposure aperture; shutter blades opening and closing the aperture for exposure; an opening and closing member capable of moving the shutter blades into a closing position and an opening position; and an electrostrictive strain element arranged so that its base portion is fixedly held by a retaining member to enable the opening and closing member to be driven by its free end and an inertia force is exerted in a direction opposite to the inertia force acting on the opening and closing member in displacement.

According to a preferred formation of the present invention, the retaining member is rotatably supported through a shaft standing upright on the base plate and a spring member is provided which biases the electrostrictive strain element in the direction that the inertia force to the electrostrictive strain element is added and the inertia force to an opening and closing lever is counterbalanced. Thereby, even if any shock is imposed to the shutter from the outside, it is possible to remove further securely such an inconvenience that the shutter blades are opened unnecessarily.

According to another preferred formation, the retaining member is designed so that its rotating range is variable by a stopper disposed to be able to adjust the position. As a result, the balance of the inertia force can be adjusted in the optimum condition with respect to each of the shutter blades.

These and other objects as well as the features and advantages of the present invention will become apparent from the following detailed description of the preferred embodiments when taken in conjunction with the accompanying drawings.

DESCRIPTION OF THE PREFERRED EMBODIMENTS

Figure 1:
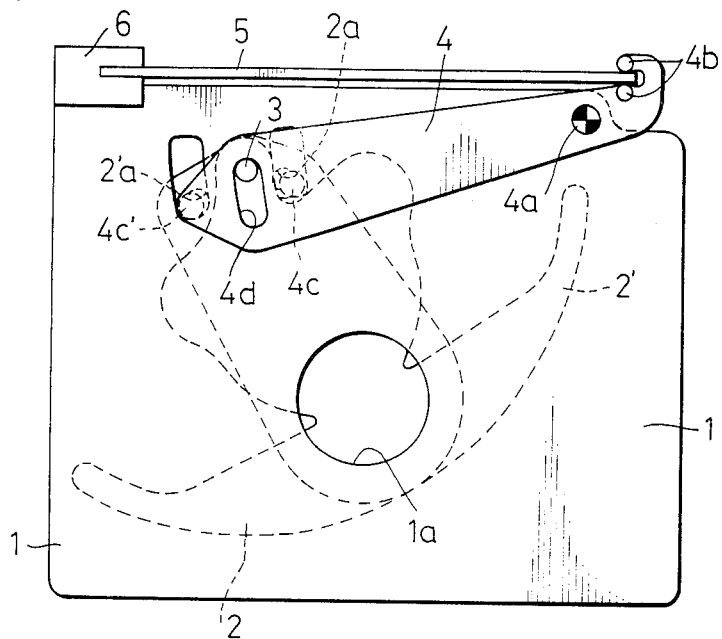
FIG. 1 is a plan view showing a first embodiment of the lens shutter according to the present invention.

Referring to the drawings, the present invention will be explained, based on the preferred embodiments, in the following.

First of all, in FIG. 1, reference numeral 1 represents a base plate, which is provided with an exposure aperture 1a. Reference numerals 2, 2' represent shutter blades, which are rotatably supported by a shaft standing upright on the base plate 1 and fit slots 2a, 2'a formed at individual ends to driving pins 4c, 4c', which will be described later, to make it possible to open and close the exposure aperture 1a. Numeral 4 represents an opening and closing lever, which is rotatably supported on the base plate 1 by a shaft 4a so that the lengths of lever arms are different from each other in such a manner that a pair of pins 4b, 4b are disposed at the end of a short arm and the driving pins 4c, 4c' stand upright toward the back side of this paper stand upright at the end of a long arm to be fitted into the slots 2a, 2'a of the shutter blades 2, 2', respectively, and which, in addition, is formed with an arcuate slot 4d fitted to the shaft 3. Numeral 5 represents an electrostrictive strain element with a long and thin plate shape, in which the base portion is fixedly held by a retaining member 6 attached to the base plate 1 and the top end portion is formed as a distortable free end to be sandwiched in between a pair of pins 4b, 4b standing upright on the opening and closing lever 4. In this case, the length of the opening and closing lever 4 including a pair of arms is selected to enable the pins 4c, 4c' to displace a sufficient distance even by slight distortion of the electrostrictive strain element in such a manner that the length of the arm provided with the pins 4b, 4b sandwiching the free end of the electrostrictive strain element is small, while the length of the arm provided with the shutter blades driving pins 4c, 4c' is sufficiently large.

As will be apparent from the structure mentioned above, the shaft 4a formed as a rotating fulcrum of the opening and closing lever 4 is disposed at a position considerably spaced from the center of gravity of the opening and closing lever 4 (i.e. a position close to the driving pins 4b, 4b), so that the opening and closing lever 4 has a counterclockwise tendency due to the unbalance of its weight when the camera is in a normal position, and the shutter blades are therefore biased in a direction to be closed. However, in the case where the camera is positioned upside down, it follows that the weight and inertia force of the opening and closing lever 4 cause the shutter blades 2, 2' to be biased in a direction to be opened. For these reasons, the above embodiment is constructed so that the inertia force acting on the opening and closing lever 4 is counterbalanced by that acting on the top end of the electrostrictive element 5.

Now, the functions of the embodiments according to the present invention will be described below.

FIG. 1 shows the state that the exposure aperture 1a is covered by the shutter blades 2, 2', that is, the state that the electrostrictive strain element 5 is not in conduction. Here, when the shutter is released and a signal is transmitted to the electrostrictive strain element 5 through a control circuit not shown, the free end of the electrostrictive strain element 5 is distorted downward around the retaining member 6 which is a fulcrum. A distortion amount is determined in such a manner that an opening diameter (i.e. diaphragm aperture) required for proper exposure is secured by the signal calculated at the control circuit in accordance with the brightness of an object to be photographed, and transmitted therefrom. By this distortion of the electrostrictive strain element 5, the opening and closing lever 4 supporting the free end of the electrostrictive strain element 5 sandwiched in between a pair of pins 4b, 4 is turned clockwise around the shaft 4a. When the opening and closing lever 4 is thus turned clockwise, as the driving pins 4c, 4c' engage originally with the slots 2a, 2'a of the shutter blades 2, 2', the shutter blades are turned clockwise and counterclockwise around the shaft 3 to open the exposure aperture 1a so that a proper diaphragm aperture is obtained. Thus, after predetermined time passes, electric charge stored in the electrostrictive strain element 5 is discharged and the electrostrictive strain element 5 is rapidly returned to its original form. Accordingly, the shutter blades 2, 2' close the exposure aperture 1a with the completion of the exposure for photographing.

As will be clear from the above explanation, the arrangement is such that the weight of the opening and closing lever 4 is substantially the same as that applied to the top end portion of the electrostrictive strain element 5 and the inertia forces acting on these components are exerted in such directions as to be counterbalanced, with the result that the variations of the exposure accuracy caused by the various positions of the camera can be blocked. In a first embodiment mentioned above, however, there still is an inconvenience that since the shutter blades are designed so that balance is maintained in a stationary state of the camera, they are inadvertently opened and closed in the case where the camera receives a shock from the outside due to, for example, transportation or a drop.

Figure 2:
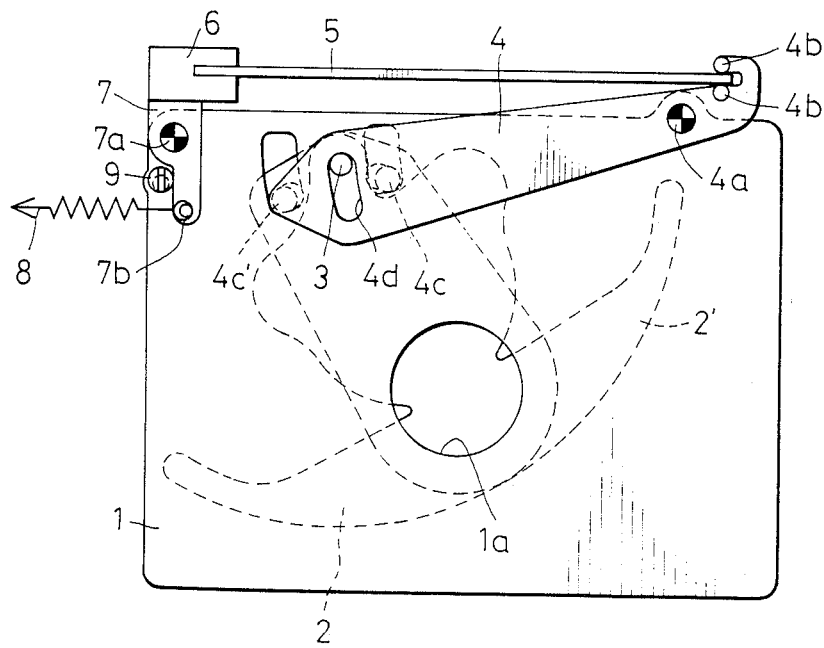
FIG. 2 is a plan view showing a second embodiment of the lens shutter according to the present invention.

To avoid this difficulty, a second embodiment according to the present invention shown in FIG. 2 is constructed so that the retaining member holding the electrostrictive strain element is rotatably supported by a shaft standing upright on the base plate and an elastic body (spring) for biasing the inertia force to the end portion opposite to that holding the electrostrictive strain element is provided. Also in the second embodiment, like reference numerals are used to designate like members and portions employed in the first embodiment and these explanations are omitted. That is, reference numeral 7 represents a movable plate, which holds the retaining member 6 at one end to be rotatable through a shaft 7a and is provided with a spring 8 at the other end 7b, thereby being biased clockwise. Reference numeral 9 represents a stopper, which is formed as, for example, an eccentric pin fitted into a hole bored through the base plate 1 so as to prevent the movable plate 7 from being rotated unnecessarily and which restricts variably the one side of a moving region of the movable plate 7.

Because the second embodiment is constructed as mentioned above, if a shock is applied from the upside in the state of the embodiment shown in FIG. 2, the opening and closing lever 4 is rotated clockwise to be intended to open the shutter blades 2, 2'. However, the clockwise rotation of the electrostrictive strain element 5 is prevented by the stopper 9, so that its reaction causes the whole component to be rotated counterclockwise around the shaft 7a against the tension of the spring 8 and as such the clockwise rotation of the opening and closing lever 4 is blocked. As a result, the inconvenience can be obviated that the shutter blades are inadvertently opened and closed for exposure. Further, according to the second embodiment, even in the case where the camera, that is, the shutter is positioned upside down, an inadvertent opening of the shutter blades can be prevented more securely.

What is claimed is:

1. A lens shutter using an electrostrictive strain element as driving source means, comprising:
a base plate having an exposure aperture;
shutter blades supported rockably on said base plate to open and close said aperture;
said electrostrictive strain element which has properties that said element is biased by application of voltage and is returned to an original form by discharge of stored electric charge and which is constructed to be fixedly held at one end by a retaining member provided on said base plate and to be free at the other end; and
an opening and closing lever supported rotatably on said base plate so that two arms are different in length from each other and engaged with said shutter blades at an end portion of a long arm and with the free end of said electrostrictive strain element at an end portion of a short arm to open and close said shutter blades through the bias and restoration of said electrostrictive strain element,
said electrostrictive strain element and said opening and closing lever being arranged so that an inertia force acting on said opening and closing lever through engagement with said electrostrictive strain element are counterbalanced by that acting on said electrostrictive strain element through engagement with said opening and closing lever.

2. A lens shutter according to claim 1, wherein said retaining member is rotatably supported on said base plate and an elastic member biasing said retaining member in such a direction as to increase said inertia force of said electrostrictive strain element is further provided.

3. A lens shutter according to claim 2, wherein a stopper restricting adjustably a rotating range of said retaining member is further provided.

4. A lens shutter according to claim 3, wherein said stopper is semi-fixedly and pivotally mounted on said base plate and is formed an eccentric pin engageable with said retaining member to prevent the rotation of said retaining member to rotate said opening and closing lever in a direction to open the shutter blades through said electrostrictive strain element.

* * * * *